(12) United States Patent
Zhou et al.

(10) Patent No.: US 11,982,771 B2
(45) Date of Patent: May 14, 2024

(54) METHOD FOR IDENTIFICATION OF A NOISE POINT USED FOR LIDAR, AND LIDAR SYSTEM

(71) Applicant: HESAI TECHNOLOGY CO., LTD., Shanghai (CN)

(72) Inventors: Xiaotong Zhou, Shanghai (CN); Shaoqing Xiang, Shanghai (CN); Zhaoming Zeng, Shanghai (CN); Zhenlei Shao, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 823 days.

(21) Appl. No.: 17/038,113

(22) Filed: Sep. 30, 2020

(65) Prior Publication Data

US 2021/0048515 A1    Feb. 18, 2021

Related U.S. Application Data

(63) Continuation of application No. PCT/CN2019/085768, filed on May 7, 2019.

(30) Foreign Application Priority Data

Apr. 22, 2019    (CN) .......................... 201910322878.X

(51) Int. Cl.
*G01C 3/08*    (2006.01)
*G01S 7/487*    (2006.01)
(Continued)

(52) U.S. Cl.
CPC ............ *G01S 7/4873* (2013.01); *G01S 17/89* (2013.01); *G01S 7/4865* (2013.01)

(58) Field of Classification Search
CPC ...... G01S 7/4873; G01S 17/89; G01S 7/4865; G01S 7/4815; G01S 7/4802; G01S 7/487; G01S 17/42; G01S 7/495; G01S 7/497
See application file for complete search history.

(56) References Cited

U.S. PATENT DOCUMENTS 9,910,136 B2    3/2018   Heo et al.
11,269,063 B1 *  3/2022  Bendickson .......... G01S 17/894
(Continued)

FOREIGN PATENT DOCUMENTS

CN    101196562 A    6/2008
CN    105842678 A    8/2016
(Continued)

OTHER PUBLICATIONS

First Search dated Sep. 30, 2019, issued in related Chinese Application No. 201910322878.X (2 pages).
(Continued)

*Primary Examiner* — Mesfin T Asfaw
(74) *Attorney, Agent, or Firm* — Sheppard Mullin Richter & Hampton LLP

(57) ABSTRACT

A method for processing a point cloud generated by a light detection and ranging system, includes: receiving a first measurement generated by the light detection and ranging system; retrieving a plurality of second measurements that are adjacent to the first measurement; calculating a first parameter by using distances of the first measurement and the plurality of second measurements, the first parameter indicating a degree of continuum of the first measurement relative to the plurality of second measurements; and determining whether the first measurement represents a measurement of noises by using the first parameter.

25 Claims, 13 Drawing Sheets

(51) Int. Cl.
*G01S 17/89* (2020.01)
*G01S 7/4865* (2020.01)

(56) References Cited

U.S. PATENT DOCUMENTS

| | | |
|---|---|---|
| 2015/0120244 A1 | 4/2015 | Ma et al. |
| 2017/0249401 A1 | 8/2017 | Eckart et al. |
| 2018/0101932 A1 | 4/2018 | Kwon et al. |
| 2019/0391270 A1* | 12/2019 | Uehara ............... G01S 17/04 |
| 2021/0033712 A1* | 2/2021 | Yang ............... G01S 7/4808 |
| 2021/0048515 A1 | 2/2021 | Zhou et al. |

FOREIGN PATENT DOCUMENTS

| | | |
|---|---|---|
| CN | 106845321 A | 6/2017 |
| CN | 107330925 A | 11/2017 |
| CN | 107833244 A | 3/2018 |
| CN | 108458715 A | 8/2018 |
| CN | 109443351 A | 3/2019 |
| CN | 109460032 A | 3/2019 |
| CN | 109597054 A | 4/2019 |
| CN | 110031822 A | 7/2019 |
| EP | 1061336 A3 | 12/2004 |
| WO | 2015/062850 A1 | 5/2015 |

OTHER PUBLICATIONS

First Office Action dated Oct. 11, 2019, issued in related Chinese Application No. 201910322878.X, with English machine translation (17 pages).
Second Office Action dated Feb. 25, 2020, issued in related Chinese Application No. 201910322878.X, with English machine translation (8 pages).
Supplemental Search dated Mar. 13, 2020, issued in related Chinese Application No. 201910322878.X (1 page).
PCT International Search Report and the Written Opinion dated Feb. 1, 2020, issued in related International Application No. PCT/CN2019/085768, with partial English translation (9 pages).
Second Office Action dated Dec. 3, 2021, issued in related Chinese Application No. 201911358883.2, with English machine translation (16 pages).
Supplementary Search dated May 9, 2022, issued in related Chinese Application No. 201911358883.2 (2 pages).
"Rural cadastral survey and rapid mapping based on Lidar technology", Chinese Doctoral Dissertations & Master's Theses Full-text Database (Master), Xinjiang University, Information Science and Technology, Nov. 15, 2017.
PCT International Preliminary Report on Patentability dated Nov. 4, 2021, issued in related International Application No. PCT/CN2019/085768, with English translation (10 pages).
First Search dated May 17, 2021, issued in related Chinese Application No. 201911358883.2 (2 pages).
First Office Action dated May 26, 2021, issued in related Chinese Application No. 201911358883.2, with English machine translation (19 pages).

* cited by examiner

METHOD FOR IDENTIFICATION OF A NOISE POINT USED FOR LIDAR, AND LIDAR SYSTEM

CROSS REFERENCE TO RELATED APPLICATIONS

This application is a continuation of International Application No. PCT/CN2019/085768, filed on May 7, 2019, which claims priority to Chinese Patent Application No. 201910322878.X, filed with the China National Intellectual Property Administration on Apr. 22, 2019. The above-referenced applications are incorporated herein by reference in their entireties.

TECHNICAL FIELD

The present disclosure relates to the field of LiDAR, and, more specifically, to a method for identification of a noise point used for a LiDAR, and a LiDAR system.

BACKGROUND

LiDAR (light detection and ranging) is a general term for laser active detection sensor devices. The working principle of LiDAR is as follows: a LiDAR emitter emits a beam of laser; the laser beam runs into an object, and returns back to a laser receiver upon diffuse reflection; and a radar module multiplies a time interval between emission and reception of the signal with the velocity of light, and divides by 2 so as to calculate out the distance between the emitter and the object. According to the number of laser beams, it usually includes, for example, single-line LiDAR, 4-line LiDAR, 8-/16-/32-/64-line LiDAR, etc. One or more laser beams are emitted at various angles in the vertical plane, achieving the detection of the three-dimensional profile of a target region through scanning in the horizontal direction. Since a plurality of measuring channels (lines) are equivalent to a plurality of scanning planes of different inclination angles, the more the laser beams in the vertical field of view, the higher the angular resolution in the vertical direction and the greater the density of a laser point cloud.

In a point cloud generated by LiDAR, noise point is always a problem that needs be overcome as much as possible. A noise point may be generated due to many causes, such as weather, or crosstalk between radars. The explanation will be made by taking the latter as an example. Currently, some LiDARs will emit a dual-pulse laser during each detection, and encode the interval time between the two pulses, which means that the time interval between the leading edges of the two pulses are modulated. However, this is a random encoding, there still will be relatively great crosstalk between two radars both using laser encoding. Especially since the types of laser encoding are limited, there is a greater probability that two radars may emit pulses with the same encoding spacing; and in that case, interference signals from other radars cannot be excluded by decoding. There is an anti-crosstalk configuration, specifically achieved as follows: encoding the spacing (time sequence) within dual-pulse each time when the dual-pulse is emitted, and using one nanosecond or two nanoseconds to distinguish each other. For example, one of 40 lines is transmitted at the same time. The forty lines will be triggered successively. Each line is encoded separately, which, at the time of receipt, is not only received by a corresponding detector, but also may be received by other detectors. Thus, laser from different channels should also be prevented from crosstalk between codes. If there is another radar nearby, crosstalk also may take place. It is an urgent problem about how to prevent crosstalk when Radar A detects an optical pulse of the same encoding emitted by Radar B.

The contents in the Background just disclose the known technologies of inventors rather than surely represent the prior art in the field.

SUMMARY

In view of at least one of the defects existing in the prior art, the present disclosure provides a method for identification of a noise point used for a LiDAR, comprising:

step S101: receiving a point cloud generated by the LiDAR;

step S102: obtaining a reflectivity and a continuity parameter of any point in the point cloud; and step S103: determining whether the point is a noise point based on the reflectivity and the continuity parameter.

According to an aspect of the present disclosure, the step S103 comprises: determining that the point is a noise point when the reflectivity is less than or equal to a predefined threshold for reflectivity and the continuity parameter is beyond a normal range of continuity parameter.

According to an aspect of the present disclosure, the step S103 comprises: obtaining a reflectivity of an adjacent point as measured immediately previously or subsequently by a channel corresponding to the point in the point cloud, wherein the point is determined to be a noise point when the continuity parameter is beyond a normal range of continuity parameter, and the difference between the reflectivity of the point and that of the adjacent point is greater than a predefined threshold for reflectivity difference.

According to an aspect of the present disclosure, the step S103 comprises: calculating a noise point confidence level of the point, and determining that the point is a noise point when the noise point confidence level is beyond a normal range of confidence level, wherein calculating the noise point confidence level of the point comprises: a continuity factor is set to zero when the continuity parameter is beyond a normal range of continuity parameter, otherwise the continuity factor is set as a continuity weight; a reflectivity factor is set to zero when the reflectivity is less than or equal to a predefined threshold for reflectivity, otherwise the reflectivity factor is set as a reflectivity weight; and the noise point confidence level equals to the sum of the continuity factor and the reflectivity factor.

According to an aspect of the present disclosure, the step S103 comprises: obtaining a reflectivity of an adjacent point as measured immediately previously or subsequently by a channel corresponding to the point in the point cloud, calculating a noise point confidence level of the point, and determining that the point is a noise point when the noise point confidence level is beyond a normal range of confidence level, wherein calculating the noise point confidence level of the point comprises: a continuity factor is set to zero when the continuity parameter is beyond a normal range of continuity parameter, otherwise the continuity factor is set as a continuity weight; a reflectivity factor is set to zero when the difference between the reflectivity of the point and that of the adjacent point is greater than a predefined threshold for reflectivity difference, otherwise the reflectivity factor is set as a reflectivity weight; and the noise point confidence level equals to the sum of the continuity factor and the reflectivity factor.

According to an aspect of the present disclosure, each channel of the LiDAR emits at least dual pulses during one detection, and a time interval between the leading edges of two pulses in the dual pulses is modulated, the method for identification of a noise point further comprises: if only one point exists in the point cloud in response to one detection by one of the channels, outputting the point regardless of whether the point is identified as a noise point; and if a plurality of points including noise points and normal points exist in the point cloud in response to one detection by one of the channels, filtering out the noise points while outputting the normal points.

According to an aspect of the present disclosure, the continuity parameter is an absolute value of a difference between a distance from the point to the LiDAR and a distance from an adjacent point as measured immediately previously or subsequently by a channel corresponding to the point in the point cloud to the LiDAR, or is a parameter characterizing a discreteness of the point that is calculated out based on the point and a plurality of its surrounding points in the point cloud.

The present disclosure further discloses a LiDAR system, comprising:

a LiDAR configured to scan its surroundings to generate a point cloud;

a denoising unit coupled to the LiDAR to receive the point cloud, and configured to perform the method for identification of a noise point described above to determine whether a point in the point cloud is a noise point; and an output unit coupled to the denoising unit, and configured to output the point cloud.

According to an aspect of the present disclosure, the LiDAR system further comprises a control unit coupled to the denoising unit, and capable of enabling or disabling the denoising unit, wherein in an enabled state, the denoising unit filters out noise points in the point cloud, and the output unit outputs the point cloud with noise points filtered out; and in a disabled mode, the denoising unit is disabled, and the output unit outputs the point cloud with noise points not being filtered out, and/or the LiDAR system further comprises an input unit for receiving input from a user, wherein the control unit is capable of enabling or disabling the denoising unit according to the input from the user.

According to an aspect of the present disclosure, each channel of the LiDAR emits at least dual pulses during one detection, and a time interval between the leading edges of two pulses in the dual pulses is modulated.

According to an aspect of the present disclosure, the output unit configured such that: if only one point exists in the point cloud in response to one detection by one of the channels, outputting the point regardless of whether the point is identified as a noise point; and/or if a plurality of points including noise points and normal points exist in the point cloud in response to one detection by one of the channels, filtering out the noise points while outputting the normal points.

The present disclosure further discloses a LiDAR system, comprising:

a LiDAR configured to scan its surroundings to generate a point cloud;

a confidence level calculating unit coupled to the LiDAR to receive the point cloud, and configured to calculate a noise point confidence level of a point in the point cloud at least based on a reflectivity and a continuity parameter of the point; and an output unit coupled to the LiDAR and the confidence level calculating unit, and configured to output the point cloud and noise point confidence levels of points in the point cloud.

According to an aspect of the present disclosure, the confidence level calculating unit is configured to calculate the noise point confidence level as follows: a continuity factor is set to zero when the continuity parameter is beyond a normal range of continuity parameter, otherwise the continuity factor is set as a continuity weight; a reflectivity factor is set to zero when the reflectivity is less than or equal to a predefined threshold for reflectivity, otherwise the reflectivity factor is set as a reflectivity weight; and the noise point confidence level equals to the sum of the continuity factor and the reflectivity factor;

wherein the output unit is configured to output points having a noise point confidence level within a normal range of confidence level in the point cloud.

According to an aspect of the present disclosure, the confidence level calculating unit is configured to obtain a reflectivity of an adjacent point as measured immediately previously or subsequently by a channel corresponding to the point in the point cloud, wherein calculating the noise point confidence level of the point comprises: a continuity factor is set to zero when the continuity parameter is beyond a normal range of continuity parameter, otherwise the continuity factor is set as a continuity weight; a reflectivity factor is set to zero when the difference between the reflectivity of the point and that of the adjacent point is greater than a predefined threshold for reflectivity difference, otherwise the reflectivity factor is set as a reflectivity weight; and the noise point confidence level equals to the sum of the continuity factor and the reflectivity factor;

wherein the output unit is configured to output points having a noise point confidence level within a normal range of confidence level in the point cloud.

According to an aspect of the present disclosure, each channel of the LiDAR emits at least dual pulses during one detection, and a time interval between the leading edges of two pulses in the dual pulses is modulated.

According to an aspect of the present disclosure, the output unit configured such that: if only one point exists in the point cloud in response to one detection by one of the channels, outputting the point regardless of whether the noise point confidence level of the point is within a normal range of confidence level.

According to an aspect of the present disclosure, the continuity parameter is an absolute value of a difference between a distance from the point to the LiDAR and a distance from an adjacent point in the point cloud as measured immediately previously or subsequently by a channel corresponding to the point to the LiDAR, or is a parameter characterizing a discreteness of the point as calculated out based on the point and a plurality of its surrounding points in the point cloud.

According to an aspect of the present disclosure, the LiDAR system further comprises an input unit for receiving input from a user, wherein the input unit is capable of instructing, based on an input from the user, the output unit about whether to filter out noise points in the point cloud; and/or wherein each channel of the LiDAR emits at least dual pulse during one detection, and a time interval between the leading edges of two pulses in the dual pulses is modulated, the output unit is configured such that: if only one point exists in the point cloud in response to one detection by one of the channels, outputting the point regardless of whether the noise point confidence level of the point is within a normal range of confidence level; and/or the output unit configured such that: if a plurality of points including noise points and normal points exist in the point cloud in response to one detection by one of the channels, filtering out the noise points while outputting the normal points.

The present disclosure further discloses a device for identification of a noise point used for a LiDAR, comprising:

a receiving unit configured to receive a point cloud generated by the LiDAR;

an obtaining unit configured to obtain a reflectivity and a continuity parameter of a point in the point cloud; and a determining unit configured to determine whether the point is a noise point at least based on the reflectivity and the continuity parameter.

The present disclosure further discloses a computer readable storage medium having stored thereon computer executable instructions that, when executed by a processor, perform the method for identification of a noise point described above.

BRIEF DESCRIPTION OF THE DRAWINGS

The accompanying drawings, as part of the present disclosure, are provided for the purpose of further understanding of the present disclosure, and the schematic embodiments and description serve to illustrate the present disclosure, both of which should not impose any improper limitation on the present disclosure. In the drawings.

DETAILED DESCRIPTION

Figure 1:
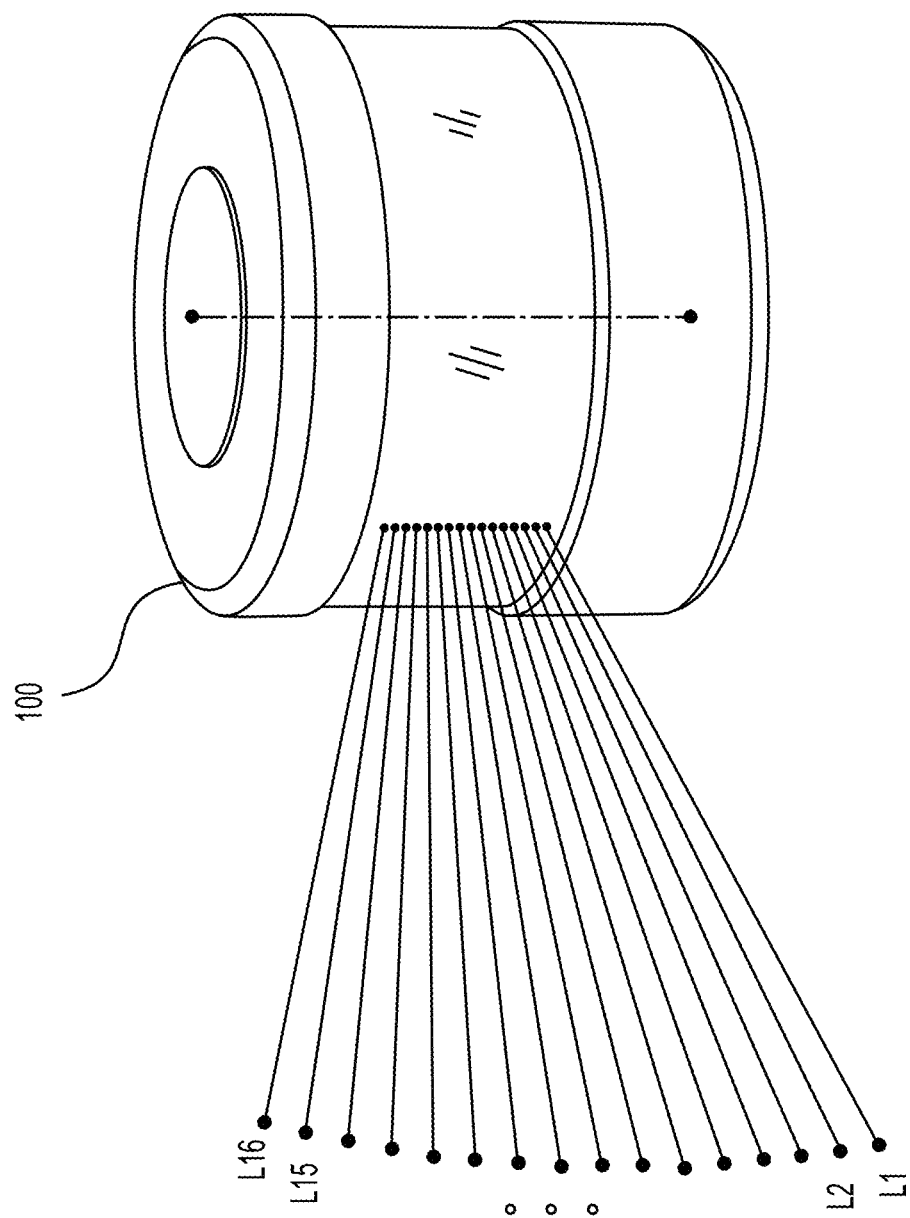
FIG. 1 is a schematic illustrating a LiDAR.

The following exemplary embodiments will be described only in a brief manner. Just as those skilled in the art will recognize, changes in various ways to the examples described herein can be carried out without departing from the spirit or scope of the present disclosure. Therefore, the drawings and description are deemed substantively exemplary, instead of limitative.

The following description, along with the accompanying drawings, sets forth the preferable examples herein. It should be understood that the preferable examples described herein are only for the purpose of illustrating and explaining, instead of limiting, the present disclosure.

In the description of the present disclosure, it need be understood that the orientation or position relations denoted by such terms as "central" "longitudinal" "latitudinal" "length" "width" "thickness" "above" "below" "front" "rear" "left" "right" "vertical" "horizontal" "top" "bottom" "inside" "outside" "clockwise" "counterclockwise" and the like are based on the orientation or position as shown in the accompanying drawings, and only used for the purpose of facilitating description for the present disclosure and simplification of the description, instead of indicating or suggesting that the denoted devices or elements must be specifically oriented, or configured or operated in some specific orientation. Thus, such terms should not be construed to limit the present disclosure.

In addition, such terms as "first" and "second" are only used for the purpose of description, rather than indicating or suggesting relative importance or implicitly indicating the number of the designated technical features. Accordingly, features defined with "first" or "second" may, expressly or implicitly, include one or more of such features. In the description of the present disclosure, "more" means two or above, unless otherwise defined explicitly and specifically.

In the description of the present disclosure, it need be specified that, unless otherwise specified and defined explicitly, such terms as "mount" "link" and "connect" should be understood as generic terms. For example, connection may refer to fixed connection, dismountable connection, or integrated connection; also to mechanical connection, electric connection or intercommunication; further to direct connection, or connection by an intermediary medium; or even to internal communication between two elements or interaction between two elements. For those skilled in the art, they can construe the specific meaning of such terms herein in light of specific circumstances.

Herein, unless otherwise specified and defined explicitly, if a first feature is "above" or "below" a second one, it may cover the direction contact between the first and second features, also cover the contact via another feature therebetween, instead of the direct contact. Furthermore, if a first feature "above", "over" or "on the top of" a second one, it may cover that the first feature is right above or on the inclined top of the second feature, or just indicate that the first feature has a horizontal height higher than that of the second feature. If a first feature is "below", "under" or "on the bottom of" a second feature, it may cover that the first feature is right below and on the inclined bottom of the second feature, or just indicates that the first feature has a horizontal height lower than that of the second feature.

The disclosure below provides many different embodiments and examples for achieving different structures described herein. In order to simplify the disclosure herein, the following will give the description of the parts and arrangements embodied in specific examples. Surely, they are just for the exemplary purpose, not intended to limit the present disclosure. Besides, the present disclosure may repeat a reference number and/or reference letter in different examples, and such repeat is for the purpose of simplification and clarity, and itself denotes none of the relations among various embodiments and/or arrangements as discussed. In addition, the present disclosure provides examples for a variety of specific techniques and materials, but the common skilled persons in the art are aware of an application of other techniques and/or a use of other materials.

The following description, along with the accompanying drawings, sets forth the preferable examples herein. It should be understood that the preferable examples described herein are only for the purpose of illustrating and explaining, instead of limiting, the present disclosure.

FIG. 1 illustrates an instance of a LiDAR 100. The LiDAR is a 16-line LiDAR, which means it may emit 16 lines of laser beams in total, including L1, L2, . . . , L15 and L16, in the vertical plane as shown in the figure (each line of laser beams just corresponds to one channel of all the 16 channels of the LiDAR) for detection of the surroundings. During the detection, the LiDAR 100 may rotate about its vertical axis. During the rotation, each channel of the LiDAR successively emits a laser beam in turn according to a certain time interval (e.g., 1 μs) and carries out detection so as to complete a line scanning in the vertical field of view; and then perform the next line scanning in the vertical field of view as spaced with a certain angle (e.g., 0.1 or 0.2 degree) in the direction of the horizontal field of view, so as to form a point cloud upon multiple times of detection during the rotation and thus be able to detect the surroundings.

Figure 2:
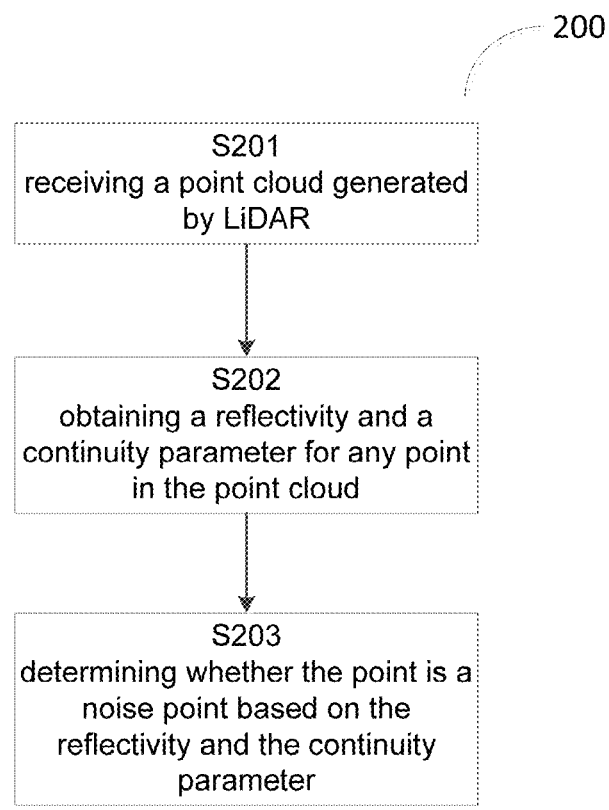
FIG. 2 illustrates a method for identification of noise point used for a LiDAR in accordance with the first aspect of the present disclosure.

FIG. 2 illustrates a method 200 for identification of noise point for a LiDAR in accordance with the first aspect of the present disclosure. As shown in FIG. 2, the method 200 for identification of noise point comprises:

At Step S201, receiving a point cloud generated by the LiDAR.

Data of the point cloud generated by the LiDAR may usually include coordinates of every point and reflectivity of the point (the reflectivity is proportional to the strength of the reflected beam and the distance between the target point and the LiDAR). In the coordinates of a point, the mounting position of a LiDAR, for example, is taken as an origin, and the offset of the point may be specifically represented by polar coordinates (i.e., distance and angle), or represented using x/y/z three-dimensional rectangular coordinates.

At Step S202, obtaining a reflectivity and a continuity parameter of any point in the point cloud.

Figure 3:
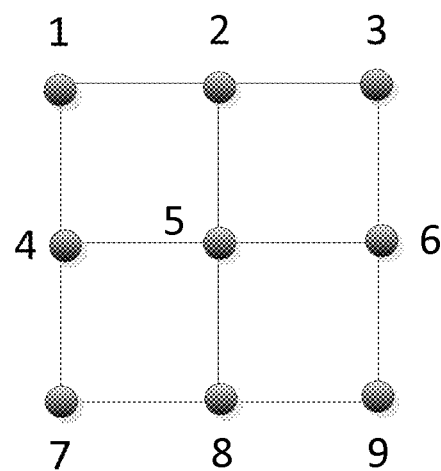
FIG. 3 schematically illustrates the projection of multiple points in a point cloud of a LiDAR onto a plane perpendicular to the laser direction.

The reflectivity of the point may be obtained directly from the data of the point cloud. Herein, the "continuity parameter" of the point may be defined as a characterization parameter that indicates the continuity between the point and one or more points of its adjacent points in the point cloud, such as the absolute value of the difference (or the weighted sum of a plurality of differences) between a distance from the point to the LiDAR and a distance from one or more of the surrounding points in the point cloud to the LiDAR. With reference to FIG. 3, the continuity parameter of the present disclosure will be described. FIG. 3 schematically illustrates the projection of a point cloud generated by a LiDAR on a plane perpendicular to the laser direction (for simplicity, the depth information is not shown in FIG. 3). Among others, point 5, for example, is a point to be determined currently, and is an echo detected out at the time $t_n$ by the laser beam L2 in FIG. 1, point 4 is an echo detected out at the last time $t_{n-1}$ by the same channel, namely by the laser beam L2, and point 6 is an echo detected out at the next time $t_{n+1}$ by the same channel, namely by the laser beam L2. Correspondingly, point 1, point 2 and point 3 are echoes detected out at the time $t_{n-1}$, $t_n$, and $t_{n+1}$ by the laser beam L3, respectively; and point 7, point 8 and point 9 are echoes detected out at the time $t_{n-1}$, $t_n$, and $t_{n+1}$ by the laser beam L1, respectively. It should be noted that although FIG. 3 shows the equal spacing between the points, this drawing is just exemplary, not meaning equidistant spacing between echo points formed at successive time($t_{n-1}$, $t_n$, and $t_{n+1}$) by the adjacent beams in the point cloud data. In the present disclosure, the continuity parameter of point 5 may either refer to the absolute value of the difference value between the distance from point 5 to the LiDAR, and the distance from any one of the eight points (that are above, below, to the left, to the right, to the upper left, to the upper right, to the lower left and to the lower right of point 5) to the LiDAR, or refer to the weighted average of the difference values between the distances from point 5 to the LiDAR and the distances from multiple points of the eight points (that are above, below, to the left, to the right, to the upper left, to the upper right, to the lower left and to the lower right of point 5) to the LiDAR. Both of these are within the scope of the present disclosure. Under the inspiration of the conception herein, those skilled in the art may make specific adaptation according to needs.

When a normal object is detected by a LiDAR, those generated points usually show a relatively good continuity. Good continuity of points herein means the lower absolute value of the difference value between the distances from adjacent points to the LiDAR, for example, within the error of range detection of the LiDAR. One of the main application scenarios of LiDAR is for detecting a variety of objects in road traffic, while the speed of a moving object in road traffic is quite lower than the velocity of light. LiDAR has a higher resolution in horizontal angles, e.g., 0.1 or 0.2 degree. Thus, mostly, especially when an object is closer to a LiDAR, the points scanned at horizontal angles in two consecutive times correspond to the same object (except for just at the edge of the object). Furthermore, LiDAR has a very high scanning frequency. For example, the time interval between performing line scanning in the same vertical field of view by two adjacent channels of the LiDAR is about 1 μs, and the cycle for one line scanning in the vertical field of view is also just more than ten μs or tens of μs, so the moving distance of a moving object in road traffic may be ignored during such a short time period. Therefore, the distances from adjacent points of a LiDAR point cloud to the LiDAR should be equal theoretically, and the difference value between the distances actually measured should be relatively tiny. When there is a great distance difference, it is very likely caused by noise points, for example, noise points caused by crosstalk between adjacent radars. For example, when the difference value (or the weighted average of multiple difference values) between the distance from a certain point to the LiDAR and the distance of any one or more of the eight points (that are above, below, to the left, to the right, to the upper left, to the upper right, to the lower left and to the lower right of the certain point) to the LiDAR is greater than a threshold (such as 1 meter), it may be deemed that the certain point has the poorer continuity, and thus the certain point may be a noise point. In addition to the use of the difference value (or the minimum difference, maximum difference, or mean difference) between the distance from a point to the LiDAR and the distance of adjacent points to the LiDAR as the continuity parameter, the correlation between a test point and its surrounding points may be also calculated to be used as the continuity parameter, which is similar to a median filter, that is, an eigenvalue can be calculated out according to convolution and may be used to characterize a discreteness degree between a current point and its surrounding points; when the discreteness degree is higher than a certain threshold, it should be deemed that the current point and the surrounding ones are discontinuous. The discreteness degree may be calculated also with reference to FIG. 3. For example, the discreteness degree of point 5 can be calculated as below:

$$x=|d5-d4|*k1+|d6-d5|*k2+|d5-d1|*k3+|d5-d2|*k4+|d5-d3|*k5+|d5-d7|*k6+|d5-d8|*k7+|d5-d9|*k8,$$

in which the smaller the value of the discreteness degree x, the better. Furthermore, k stands for weight. The weights of any point to be determined and every of its surrounding points may be either the same or different.

Moreover, the threshold for the continuity parameter may also be variable. For example, the continuity parameter may be adjusted according to the distance between a test point and the LiDAR, and if the distance increases, the measuring error for the LiDAR will also become greater correspondingly, and the threshold for the continuity parameter may be set at a greater value.

In addition, in accordance with another example described herein, the difference value between the respective distances from two points to the LiDAR can be calculated approximately as the distance between these two points. This is because of the very small angular spacing between two points in the horizontal direction, e.g., 0.1 or 0.2 degree, in the process of scanning by the LiDAR. Thus, in this case, the distance between points 4 and 5 approximately equals to the absolute value of the difference value between the distance from point 4 to the LiDAR and the distance from point 5 to the LiDAR.

At Step S203: determining whether the point is a noise point based on the reflectivity and the continuity parameter.

The method for determination of a noise point herein based on the reflectivity and the continuity parameter will be described in detail.

In accordance with one example described herein, a noise point may be identified and determined by means of the continuity parameter in combination with reflectivity. For example, when the continuity parameter is beyond the normal range of continuity parameter (for example, the continuity parameter is calculated as the absolute values of the difference values between the distance from the point to the LiDAR and the distances from the surrounding points to the LiDAR, and the normal range of continuity parameter is, for example, less than or equal to 1 meter, or 0.5 meter), and the reflectivity is less than or equal to a predefined threshold for reflectivity (such as 2%), the point is determined to be a noise point.

Additionally or alternatively, the change quantity or the change rate of the reflectivity of the point can be calculated. For example, Step S203 comprises: obtaining reflectivity of an adjacent point as measured immediately previously and/or subsequently by a channel corresponding to the point in the point cloud, wherein the point is determined to be a noise point when the continuity parameter is beyond a normal range of continuity parameter, and the absolute value of the difference between the reflectivity of the point and that of the adjacent point is greater than a threshold for reflectivity difference and/or the change rate of the reflectivity of the point relative to the reflectivity of the adjacent point is greater than a threshold for the change rate of reflectivity. For example, if the current point is point 5 in FIG. 3, then by obtaining reflectivity of an adjacent point (point 4 and/or point 6) as measured previously and/or subsequently by a channel corresponding to point 5, the difference value or the change rate of the reflectivity of point 5 relative to point 4 and/or point 6 can be obtained to be used for determination of a noise point.

Moreover, the inventors of the present application discover that the noise of the echo corresponding to a point to be determined is also a factor that may be used for determining a noise point, especially in the case of snow.

Figure 4A:
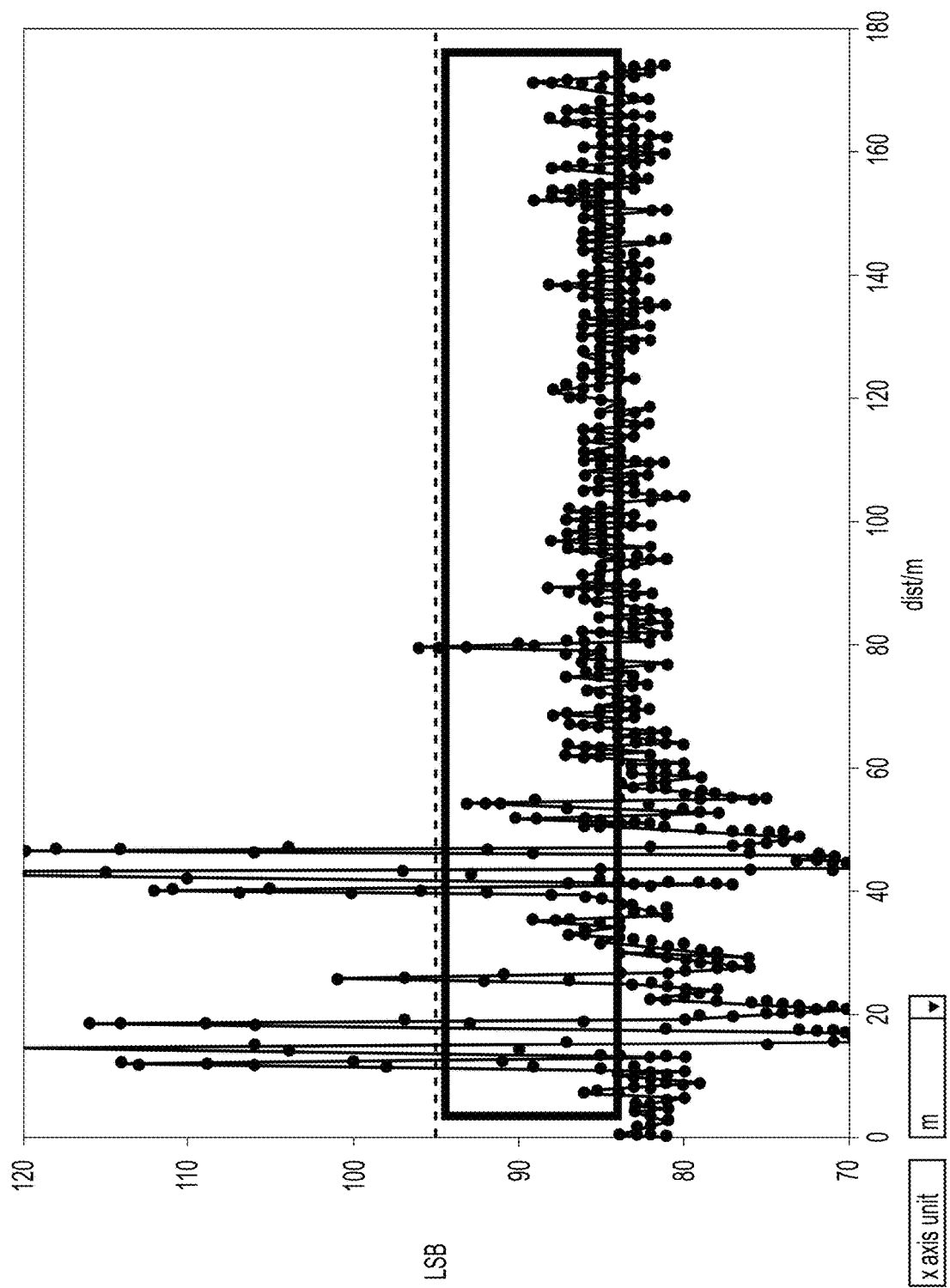
FIG. 4A illustrates a method for calculating the noise of echoes in accordance with one example of the present disclosure.

In a LiDAR, the laser beams emitted by the emitter of the LiDAR run into an object, and form echoes upon diffuse reflection, which are then received by the laser receiver to generate analog data signals (i.e., echo waveform signals); the analog data signals are sampled by ADC at a certain frequency, and quantization-coded, thereby obtaining a series of sampling points, as shown in FIG. 4A. Waveform noises may be characterized using RMS, i.e., characterizing the fluctuation degree of the waveform, and its specific calculation may be conducted by obtaining the sum of the square of the difference value between each sampling point and echo base line and then calculating the square root of the sum. The echo base line herein refers to a mean value of signals generated by the laser receiver without laser beam reflection, which may be construed as a background noise signal value.

In addition, the operation of calculating RMS is relatively complicated, the computing resource of FPGA is also so limited that it is rather difficult to use FPGA to perform such a calculation, and a waveform may further contain normal echo signals besides noise, thereby making it difficult to have statistics. Therefore, other numerical values which can be calculated easily may also be used for characterizing the noise of the waveform. For example, in accordance with one preferable example described herein, as shown in FIG. 4A, the echo base line is 85 LSB (Least Significant Bit) value of ADC; and within the range of 10 LSB value above the echo base line, counting 200 sampling points (a number based on experience, which may be likewise 100 or 300 surely) from left to right, the magnitude of the noise of the waveform may be characterized by using the sum or average value of the difference value between the ordinate value of each sampling point and the echo base line, or using the area of a graph surrounded by a curve formed by connecting 200 sampling points, a straight line through the abscissa of the first sampling point and parallel to the Y-axis, a straight line through the abscissa of the 200th sampling point and parallel to the Y-axis, and the echo base. It need be specified that the LSB value is the unit to characterize the magnitude of the signal after ADC sampling in the circuit, and is relevant to the performance of the adopted ADC. In addition, the 10 LSB value above the echo base line as selected in the preferable example has relation to an echo signal detection threshold as predefined for the LiDAR, in which the echo signal detection threshold is used by the system to determine that a signal is a valid echo signal when the signal has the signal strength greater than or equal to the echo signal detection threshold, and to determine that the signal is noise when it has the signal strength less than the echo signal detection threshold. Those skilled in the art also may select other suitable values according to their mastered prior technologies and knowledge in the field. Of course, in practical implementation, those skilled in the art may also adopt other units besides LSB value to characterize the strength and magnitude of echo signals; and using LSB value as the unit of echo to describe the strength of echo signals herein is just to allow those skilled in the art to better understand and implement the present invention, and it imposes no limits to the protection scope of the present invention.

Figure 4B:
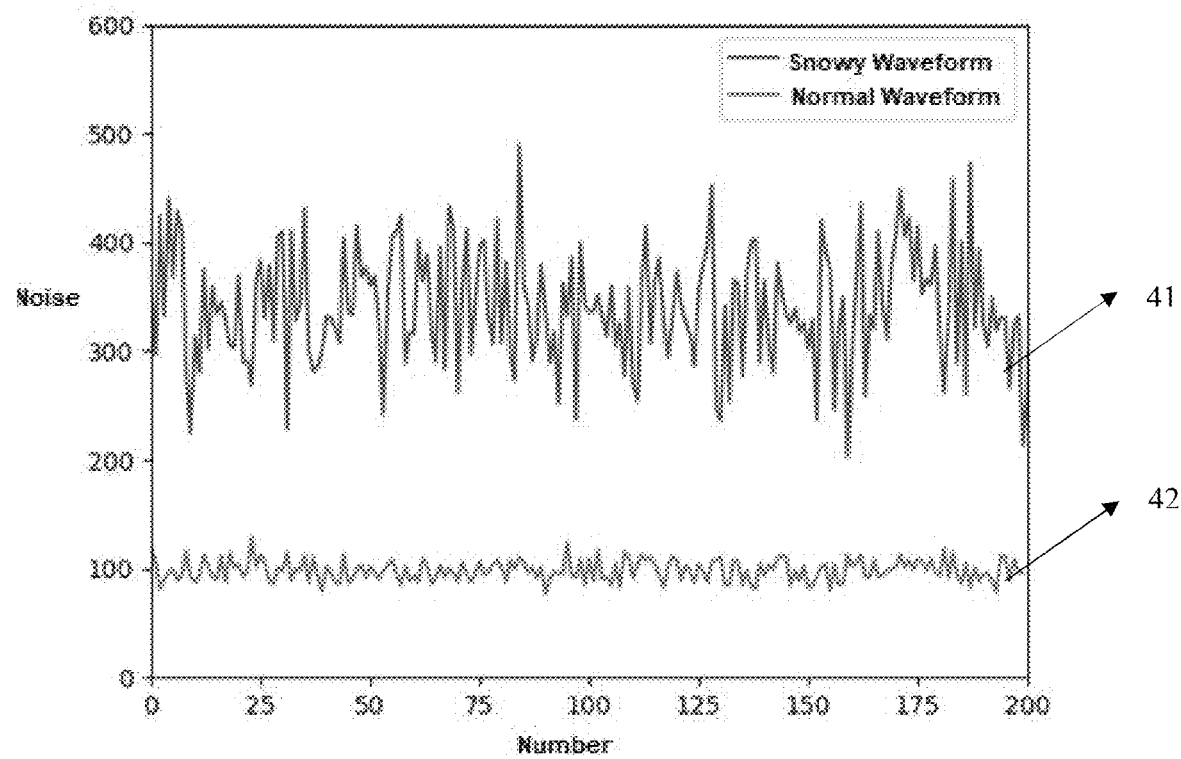
FIG. 4B illustrates a comparison between the waveform noise in the case of snow and the normal waveform noise in accordance with one example of the present disclosure.

In accordance with one example described herein, the method is used to calculate the noise of the echo of a normal point under snowy weather and the noise of the echo of a noise point caused by the snowy weather. As shown in FIG. 4B, the echo noise of each noise point caused by the snowy weather is above 200 (unitless), while the noise of the waveform of a normal point is about 100 only. They may be easily distinguished from each other. Moreover, lines 41 and 42 in FIG. 4B, though presented as continuous lines, are both actually the lines constituted by connecting discrete points one by one. The abscissa stands for the number of measured points, and the abscissa 200 in the figure represents 200 times of detection (200 points) conducted for the same one scenario, thereby obtaining 200 results of noise detection correspondingly, for example, obtaining 200 waveforms of the echo signals similar to that in FIG. 4A. Subsequently, for example, for the abscissa of 1, the ordinate of the points in line 42 represents that the noise of the echo of a normal point is 99, and the ordinate of the points in line 41 represents that the noise of the echo of the noise points caused by the snowy weather is 302. And for example, for the abscissa of 25, which represents the 25th test, the ordinate of the points in line 42 represents that the noise of the echo of a normal point is 102, while the ordinate of the points in line 41 represents that the noise of the echo of the noise points caused by the snowy weather is 298.

In accordance with one example described herein, a noise point may be identified and determined by means of a combination of continuity, reflectivity and noise. For example, when the continuity parameter is beyond a normal range of continuity parameter (such as 1 meter), the reflectivity is less than or equal to a predefined threshold for reflectivity (such as 2%), and the noise of the point is greater than a noise threshold (such as 200), the point is determined to be a noise point.

Moreover, the inventors of the present application discover that the number of echo pulses is also another factor available for determining a noise point. A laser beam containing one laser pulse is emitted to an object, and reflected back, forming an echo beam which is detected by a LiDAR. Theoretically, the number of echo pulses being detected should be one only. However, during practical detection, the number of echo pulses that may be detected as greater than the measuring threshold is often more than one for some reasons. For example, a laser beam will gradually diffuse as it travels forward, so that it may run into two different objects successively. The inventors find that the number of echo pulse may increase under rainy, snowy or foggy weather. Therefore, during detection of a certain point, when the number of the detected echo pulses is more than a pulse number threshold (e.g., 3), it may indicate that the point may be a noise point. In addition, to reduce crosstalk between two different LiDARs, the laser beams emitted by LiDARs are usually pulse-encoded. For example, a detecting laser beam includes two laser pulses, the time interval of which is encoded, i.e., dual-pulse laser detection. Therefore, during the dual-pulse laser detection, the pulse number threshold may be set at 7. For example, when the number of the detected echo pulse is more than a pulse number threshold (e.g., 7), it indicates that the point may be a noise point.

In accordance with one example described herein, a noise point may be identified and determined by means of a combination of continuity, reflectivity and the number of echo pulses. For example, when the continuity parameter is beyond a normal range of continuity parameter (such as 1 meter), the reflectivity is less than or equal to a predefined threshold for reflectivity (such as 2%), and the number of echo pulses is more than a pulse number threshold (such as 7), the point is determined to be a noise point.

In accordance with one example described herein, a noise point may be identified and determined by means of a combination of continuity, reflectivity, noise and the number of echo pulses. For example, when the continuity parameter is beyond a normal range of continuity parameter (such as 1 meter), the reflectivity is less than or equal to a predefined threshold for reflectivity (such as 2%), the noise of the point is greater than a noise threshold (such as 200), and the number of echo pulses is more than a pulse number threshold (such as 7), the point is determined to be a noise point.

In accordance with one example described herein, a noise point may be identified and determined by means of a combination of distance and reflectivity. The inventors discover that noise points usually concentrate within a range of 5-10 meters away from the LiDAR, or more prominently within a range of 5-7 meters. Meanwhile, the reflectivity of a noise point is usually less than or equal to 2%. Thus, a noise point may be identified according to a combination of distance and reflectivity. For example, when the distance is within a predefined range of distance (such as 5-10 meters, or 5-7 meters), and the reflectivity is less than or equal to a predefined threshold for reflectivity (such as 2%), the point is determined to be a noise point. It is very effective of such combination to determine a noise point caused by the rainy, snowy or foggy weather.

In accordance with one example described herein, a noise point may be identified and determined by means of a combination of distance and continuity parameter. For example, when the distance is within a predefined range of distance (such as 5-10 meters, or 5-7 meters), and the continuity parameter is beyond a normal range of continuity parameter (such as 1 meter), the point is determined to be a noise point. As stated above, the continuity parameter is the difference value between the distance from the current point to the LiDAR and the distance from a previous point (a point on the left in FIG. 3) and/or a subsequent point (a point on the right in FIG. 3) by the same channel to the LiDAR, or the difference value between the distance from the current point to the LiDAR and the distance from a point by an adjacent channel above or below the same channel (the upper point and/or the lower point in FIG. 3) to the LiDAR, or the distance of the current point to other adjacent points in the point cloud, or a variable characterizing the discreteness degree of the current point relative to its surrounding points. If a continuity parameter is beyond the normal range of continuity parameter, it indicates that the point is likely to be a noise point, rather than a point actually located on a surrounding object. It is very effective of such combination to determine a noise point caused by rainy, snowy or foggy weather.

In accordance with one example described herein, a noise point may be identified and determined by means of a combination of distance, reflectivity and continuity. For example, when the distance is within a predefined range of distance (such as 5-10 meters, or 5-7 meters), the reflectivity is less than or equal to a predefined threshold for reflectivity (such as 2%), and the continuity parameter is beyond a normal range of continuity parameter (such as 1 meter), the point is determined to be a noise point.

In accordance with one example described herein, a noise point may be identified and determined by means of a combination of distance, reflectivity, continuity and noise. For example, when the distance is within the predefined range of distance (such as 5-10 meters, or 5-7 meters), the reflectivity is less than or equal to a predefined threshold for reflectivity (such as 2%), the continuity parameter is beyond the normal range of continuity parameter (such as 1 meter), and the noise of the point is greater than a noise threshold (such as 200), the point is determined to be a noise point.

In accordance with one example described herein, a noise point may be identified and determined by means of a combination of distance, reflectivity, continuity and the number of echo pulses. For example, when the distance is within the predefined range of distance (such as 5-10 meters, or 5-7 meters), the reflectivity is less than or equal to a predefined threshold for reflectivity (such as 2%), the continuity parameter is beyond the normal range of continuity parameter (such as 1 meter), and the number of echo pulses is more than a pulse number threshold (such as 7), the point is determined to be a noise point.

In accordance with one example described herein, a noise point may be identified and determined by means of a combination of distance, reflectivity, continuity, noise and the number of echo pulses. For example, when the distance is within the predefined range of distance (such as 5-10 meters, or 5-7 meters), the reflectivity is less than or equal to a predefined threshold for reflectivity (such as 2%), the continuity parameter is beyond the normal range of continuity parameter (such as 1 meter), the noise of the point is greater than a noise threshold (such as 200), and the number of echo pulses is more than a pulse number threshold (such as 7), the point is determined to be a noise point.

In accordance with one example described herein, noise may be used to determine whether a state of weather is snowy. For example, when the noise of the point is greater than a noise threshold (such as 200), it is determined that the state of weather is snowy, or the noise point is a noise point caused by the state of snowy weather. Since the echo noise becomes larger under snowy weather, and as shown in FIG. 4B, the echo noise of almost every point is above 200 under snowy weather, this one factor, i.e. echo noise, may be substantially used to determine a noise point under snowy weather.

In accordance with one example described herein, a combination of noise and distance may be used to determine whether a state of weather is snowy. For example, when the noise of the point is greater than a noise threshold (such as 200), and the distance is within the predefined range of distance (such as 5-10 meters, or 5-7 meters), it is determined that the state of weather is snowy, or the point is a noise point caused by the snowy state of weather.

In accordance with one example described herein, a combination of noise and continuity may be used to determine whether a state of weather is snowy. For example, when the noise of the point is greater than a noise threshold (such as 200), and the continuity parameter is beyond the normal range of continuity parameter (such as 1 meter), it is determined that the state of weather is snowy, or the point is a noise point caused by the snowy state of weather.

In accordance with one example described herein, a combination of noise, distance and continuity may be used to determine whether a state of weather is snowy. For example, when the noise of the point is greater than a noise threshold (such as 200), the distance is within the predefined range of distance (such as 5-10 meters, or 5-7 meters), and the continuity parameter is beyond the normal range of continuity parameter (such as 1 meter), it is determined that the state of weather is snowy, or the point is a noise point caused by the snowy state of weather.

In accordance with one example described herein, a combination of noise, distance and the number of echo pulses may be used to determine whether a state of weather is snowy. When the noise of the point is greater than a noise threshold (such as 200), the distance is within the predefined range of distance (such as 5-10 meters, or 5-7 meters), and the number of echo pulses is more than a pulse number threshold (such as 7), it is determined that the state of weather is snowy, or the point is a noise point caused by the snowy state of weather.

In accordance with one example described herein, a combination of noise, distance, continuity parameter and the number of echo pulses may be used to determine whether a state of weather is snowy. When the noise of the point is greater than a noise threshold (such as 200), the distance is within the predefined range of distance (such as 5-10 meters, or 5-7 meters), the continuity parameter is beyond the normal range of continuity parameter (such as 1 meter), and the number of echo pulses is more than a pulse number threshold (such as 7), it is determined that the state of weather is snowy, or the point is a noise point caused by the snowy state of weather.

In accordance with one example described herein, a combination of the number of echo pulses and distance can be used to determine whether a state of weather is rainy or foggy. When the number of echo pulses is more than a pulse number threshold (such as 7), and the distance is within the predefined range of distance (such as 5-10 meters, or 5-7 meters), it is determined that the state of weather is rainy or foggy, or the point is a noise point caused by the rainy or foggy state of weather.

As enumerated in the foregoing various examples, parameters including reflectivity, continuity of distance, and continuity of reflectivity, or various combinations thereof, can be used to determine a noise point. In accordance with one example described herein, by means of calculating the noise point confidence level of a point, the point may be likewise determined to be a noise point when the noise point confidence level of the point is beyond a normal range of confidence level.

With regard to the foregoing examples of various combinations, a corresponding noise point confidence level may be calculated, and the calculation method thereof will be provided as below only for the purpose of illustration.

With regard to the example involving identification and determination of a noise point by using a combination of continuity parameter and reflectivity, the calculation method as shown in Table 1, for example, may be adopted.

TABLE 1

| Characteristic Parameter | Determination Condition | Weight |
|---|---|---|
| Continuity parameter | Continuity parameter exceeding 1 meter | 5 |
| Reflectivity | Reflectivity less than or equal to 2% | 5 |

For example, with regard to each of the characteristic parameters above, if the determination condition for the characteristic parameter is satisfied, the contribution coefficient or factor of the confidence level brought by the characteristic parameter is 0, otherwise the contribution coefficient or factor of the confidence level brought by the characteristic parameter is a weight of the characteristic parameter. Finally, if the final confidence level is determined to be beyond the normal range of confidence level, a noise point is determined.

For example, if a certain point m has a continuity parameter of 2 meters, then the determination condition of continuity is satisfied, and the continuity factor will be 0; and if the reflectivity is 1%, thereby the determination condition for reflectivity is met, then the reflectivity factor is set as 0. The noise point confidence level equals to the sum of the continuity factor and the reflectivity factor, namely, 0+0=0. The normal range of confidence level may be set according to experience and/or specific weather or environment conditions. In accordance with one example, the normal range of confidence level is greater than or equal to 10. When a confidence level is greater than or equal to 10, it indicates the point is a normal point; and when a confidence level is beyond the range, namely, less than 10, it indicates the point is a noise point. The noise point confidence level calculated out in the above instance is 0, which is beyond the normal range of confidence level, and thus it indicates that the point m is likely to be a noise point. In accordance with one example described herein, the weight of continuity is equal to that of reflectivity, as shown in Table 1.

It need be specified that the weight for each of the characteristic parameters above and the normal range of confidence level set at 10 are just examples of the present disclosure, and the weight for each characteristic parameter and the normal range of confidence level may be changed as needed. The endpoints of the normal range of confidence level may be referred to as confidence level threshold, for example, 10.

Or alternatively, the determination condition for of reflectivity in Table 1 can be modified as such: the change rate of the reflectivity of the point relative to the reflectivity of a previous/subsequent point by the same channel is greater than a threshold for the change rate (such as 50%). This is because when a sudden change takes place in the change rate of the reflectivity of points detected by the same channel for two consecutive times, it often indicates that the point is a noise point. The details are as shown in Table 2.

TABLE 2

| Characteristic Parameter | Determination Condition | Weight |
| --- | --- | --- |
| Continuity parameter | Continuity parameter exceeding 1 meter | 5 |
| Change rate of reflectivity | Change rate of reflectivity greater than or equal to 50% | 5 |

With regard to each of the characteristic parameters above, if the determination condition for the characteristic parameter is satisfied, the contribution coefficient or factor of the confidence level brought by the characteristic parameter is 0, otherwise the contribution coefficient or factor of the confidence level brought by the characteristic parameter is a weight of the characteristic parameter. Finally, if the final confidence level is beyond the normal range of confidence level, a noise point is determined.

An example will be taken for illustration. If a certain point m has a continuity parameter of 0.5 meters, then the determination condition of continuity is not satisfied, and the continuity factor will be 5. The reflectivity of the point m is 3% and the reflectivity of the next point by the channel corresponding to the point m is 1%. Thus, the change rate of the reflectivity of the point m is the absolute value of (1%-3%)/3%, i.e., 66.7%, thereby being greater than 50% and the determination condition of the change rate of reflectivity is met, and the reflectivity factor is set to 0. The noise point confidence level equals to the sum of the distance factor and reflectivity factor, namely, 5+0=5. The normal range of confidence level is, for example, greater than or equal to 10. The noise point confidence level calculated out in the above instance is 5, which is beyond the normal range of confidence level, and thus it indicates that the point m is likely to be a noise point.

Table 3 shows a calculation method to identify and determine a noise point according to a combination of distance, reflectivity and continuity, by means of calculation of a noise point confidence level.

TABLE 3

| Characteristic Parameter | Determination Condition | Weight |
| --- | --- | --- |
| Distance | Distance between 5 and 10 meters | 10 |
| Reflectivity | Reflectivity less than or equal to 2% | 5 |
| Continuity | Continuity parameter exceeding 1 meter | 5 |

Among others, calculation of a noise point confidence level of the point is, for example, as follows: a distance factor is set to zero when the distance is within the range of the predefined distance, otherwise the distance factor is set as a distance weight; a reflectivity factor is set to zero when the reflectivity is less than or equal to the predefined threshold for reflectivity, otherwise the reflectivity factor is set as a reflectivity weight; and a continuity factor is set to zero when the continuity parameter is beyond the normal range of continuity parameter, otherwise the continuity factor is set as a continuity weight. The noise point confidence level equals to the sum of the distance factor, the reflectivity factor and the continuity factor.

In accordance with one example described herein, each channel of the LiDAR at least emits dual pulses during one detection, and the method 100 for identification of a noise point further comprises: if only one point exists in the point cloud in response to one detection by one of the channels, then the point will be output regardless of whether the point is identified as a noise point. This is beneficial for preventing points at the edge of the object from being discarded as noise points. And if a plurality of points including noise points and normal points exist in the point cloud in response to one detection by one of the channels, then the noise points will be filtered out while the normal points will be output.

For one detection by each channel of the LiDAR, two or even more points may be obtained in the point cloud. In accordance with one example described herein, with regard to any measurement by each channel, preferably, at most two points are output, and two points showing the best continuity are output, after completion of each determination process.

Table 4 shows a calculation method to identify and determine a noise point according to a combination of distance, reflectivity, continuity, noise and the number of echo pulses, by means of calculation of a noise point confidence level.

TABLE 4

| Characteristic Parameter | Determination Condition | Weight |
| --- | --- | --- |
| Distance | Distance between 5 and 10 meters | 10 |
| Reflectivity | Reflectivity less than or equal to 2% | 5 |
| Continuity | Continuity parameter exceeding 1 meter | 5 |
| Noise | Waveform noise greater than 200 | 3 |
| Pulse Number | Pulse number greater than 7 | 3 |

Among others, calculation of a noise point confidence level of the point is as follow: a distance factor is set to zero when the distance is within the range of the predefined distance, otherwise the distance factor is set as a distance weight; a reflectivity factor is set to zero when the reflectivity is less than or equal to the predefined threshold for reflectivity, otherwise the reflectivity factor is set as a reflectivity weight; a continuity factor is set to zero when the continuity parameter is beyond the normal range of continuity parameter, otherwise the continuity factor is set as a continuity weight; a noise factor is set to zero when the noise is greater than the threshold for noise, otherwise the noise factor is set as a noise weight; and an echo pulse number factor is set to zero when the number of echo pulses is greater than the threshold for pulse number, otherwise the echo pulse number factor is set as an echo pulse number weight. The noise point confidence level equals to the sum of the distance factor, the reflectivity factor, the continuity factor, the noise factor and the echo pulse number factor.

In accordance with one preferable example disclosed herein, the distance weight, the reflectivity weight, the continuity weight, the noise weight and the echo pulse number weight satisfy one or more of the following conditions:

The distance weight equals to the sum of the reflectivity weight and the continuity weights;

The reflectivity weight equals to the continuity weight;

The distance weight equals to the threshold for confidence level;

The sum of the noise weight and the echo pulse number weight equals to the reflectivity weight and/or the continuity weight; and The distance weight is greater than the reflectivity weight, the continuity weight, the noise weight and the echo pulse number weight.

In accordance with one preferable example described herein, the distance weight, reflectivity weight, continuity weight, noise weight and echo pulse number weight may be dynamically adjusted according to the detected state of weather, including adjusting the absolute value of each weight and the relative proportional relation therebetween.

For example, echo noise is greater under snowy weather, and almost every point in the point cloud has echo noise greater than 200. Moreover, reflectivity under snowy weather has a greater value, thus it is difficult to determine a noise point caused by snowy weather according to the reflectivity. Therefore, correspondingly, the reflectivity weight should be reduced under snowy weather. Thus, when snowy weather is detected, the reflectivity weight (reflectivity) may be dynamically lowered while the noise weight (echo noise) may be increased.

Moreover, when foggy weather is detected, the echo pulse number weight may be increased.

Figure 5A:
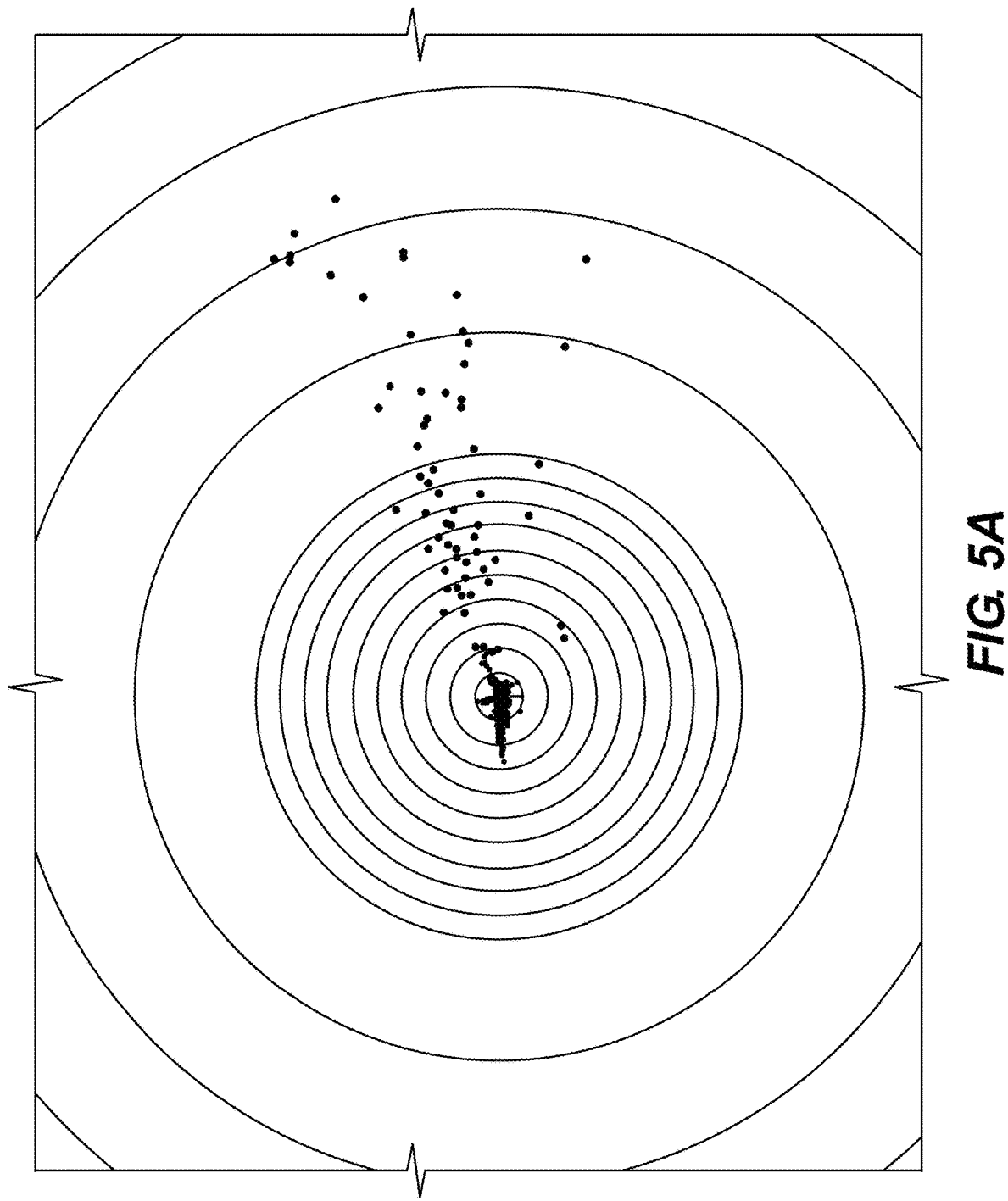
FIG. 5A illustrates an image of an original point cloud.
Figure 5B:
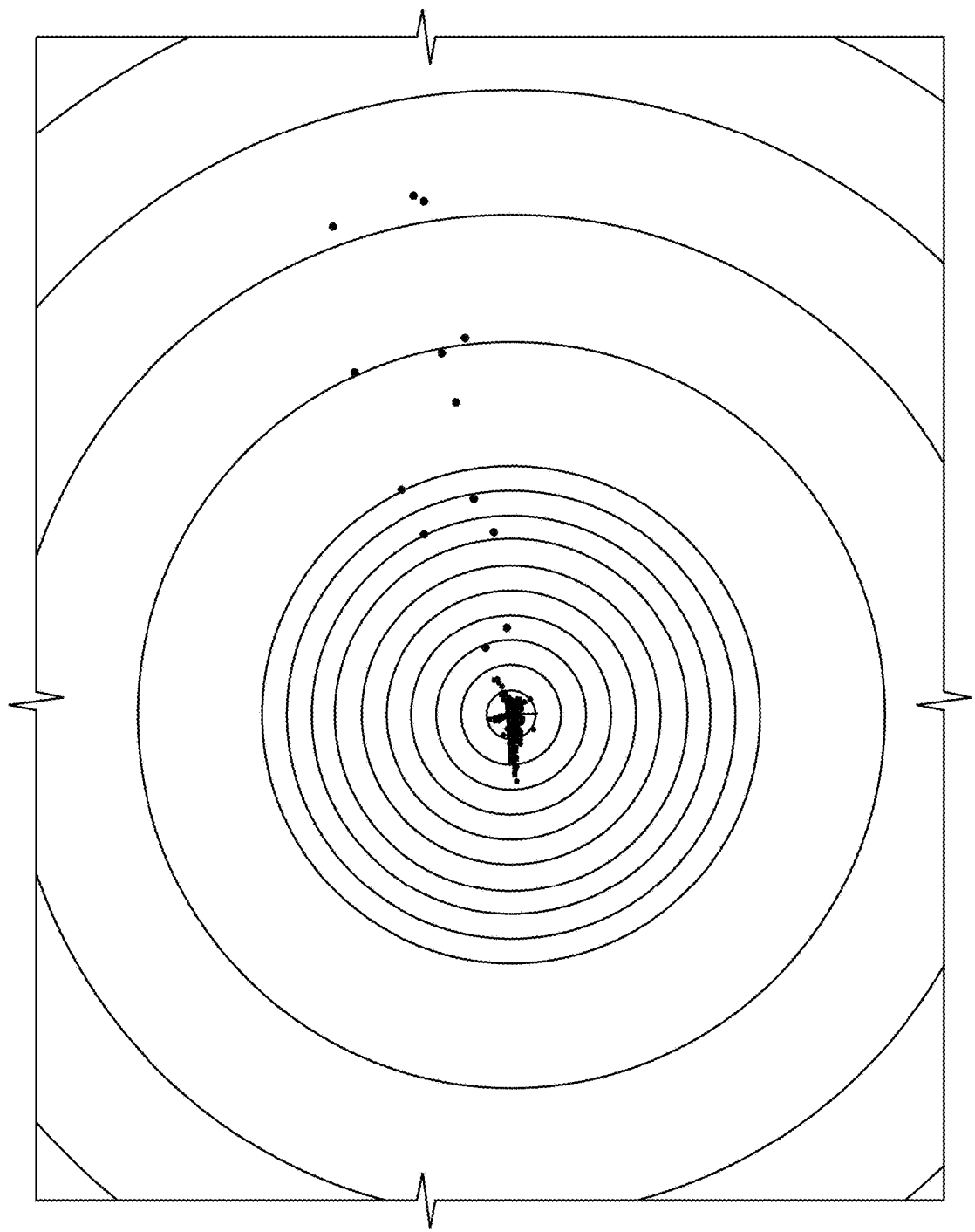
FIG. 5B illustrates an image of a point cloud processed in accordance with one example of the present disclosure.

In accordance with one preferable example described herein, each channel of the LiDAR emits at least dual pulses during one detection, and a time interval between the leading edges of two pulses in the dual pulses is modulated. The method for identification of a noise point of the present disclosure further comprises: checking whether any more normal points (non-noise points) exist in the current measurement by the channel after noise points or suspected noise points are confirmed. If there are normal points, normal points will be output; otherwise, the noise points or suspected noise points will be output. This solution is beneficial to the detection of the edge of an object. FIGS. 5A and 5B show the result of a comparison conducted in an indoor scenario when two radars stand 40 cm apart. FIG. 5A illustrates an original point cloud of a LiDAR, and FIG. 5B illustrates a point cloud output after processing including confirmation of a noise point and determination of whether normal points exist in the current measurement. The result indicates noise points caused by crosstalk between radars can be quite effectively filtered out by adopting the filtration method of the present disclosure, and the filtration method can be used to reduce the number of noise points caused by crosstalk between radars from 70~120 to 15~30 per frame, reducing to one fourth of the previous number. Additionally, such filtration method generally will not cause loss of points.

Additionally, by means of the examples of the present disclosure, not only can noise points caused by crosstalk between adjacent radars be determined and filtered, but also noise points caused by, for example, rainy, snowy or foggy state of weather can be identified.

The thresholds, weights and the proportional relations between weights of various parameters in the examples illustrated above are just determined by the inventors according to experience and a large number of experiments, are illustrated as preferable examples of the present disclosure, and should not serve to limit the protection scope of the present disclosure.

Second Aspect

Figure 6:
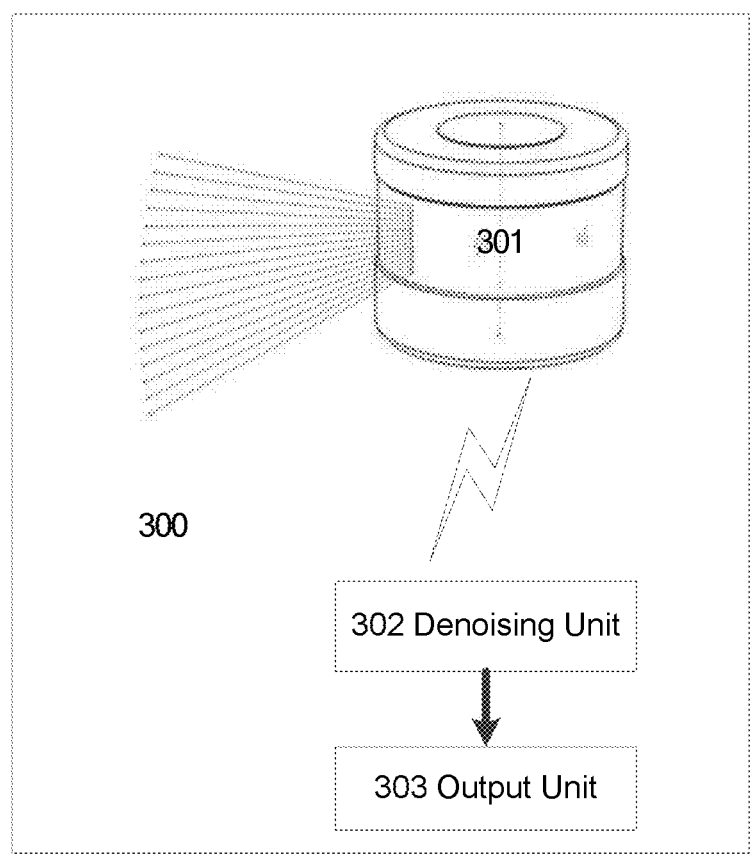
FIG. 6 schematically illustrates a LiDAR system in accordance with the second aspect of the present disclosure.

The second aspect of the present disclosure involves a LiDAR system 300. With reference to FIG. 6, the detailed description will be made as below.

As shown in FIG. 6, the LiDAR system 300 comprises: a LiDAR 301, a denoising unit 302, and an output unit 303. Among others, the LiDAR 301, for example, may be an existing LiDAR, as the LiDAR 100 as shown in FIG. 1, and is configured to scan surroundings to generate a point cloud, while its specific structure will not be described in detail here. The denoising unit 302 is coupled to the LiDAR 301 to receive the point cloud, and configured to perform the method 200 for identifying a noise point as described in the first aspect of the present disclosure to determine whether a point in the point cloud is a noise point, and configured to filter out noise points. The output unit 303 is coupled to the denoising unit 302, and outputs the point cloud. As shown, the information flow from the denoising unit 302 to the output unit 303 is unidirectional, but the present disclosure is not limited to this because a bidirectional information flow between them is also possible.

As shown in FIG. 6, the LiDAR 301, the denoising unit 302 and the output unit 303 are three separate units. But this is just for the exemplary purpose. Both the denoising unit 302 and the output unit 303 may be integrated into the LiDAR 301. For example, a denoising unit 302 may be added to the current LiDAR 301, to receive point cloud data, and determine and filter out noise points according to the method 200 for identification of noise point, and then by using the output unit 303, i.e., an output interface, the point cloud with noise points filtered out is output and presented to a user. Of course, the LiDAR 301, the denoising unit 302 and the output unit 303 also may be separate units. For example, the LiDAR 301 is only responsible for laser detection of the surroundings, and output of original point cloud data. The denoising unit 302 and the output unit 303, for example, may be a computer, workstation, or application specific integrated circuit (ASIC) responsible for data processing, which, after receiving the point cloud data, perform such operations as identification and filtering of noise points and output. These should all fall within the protection scope hereof.

Figure 7:
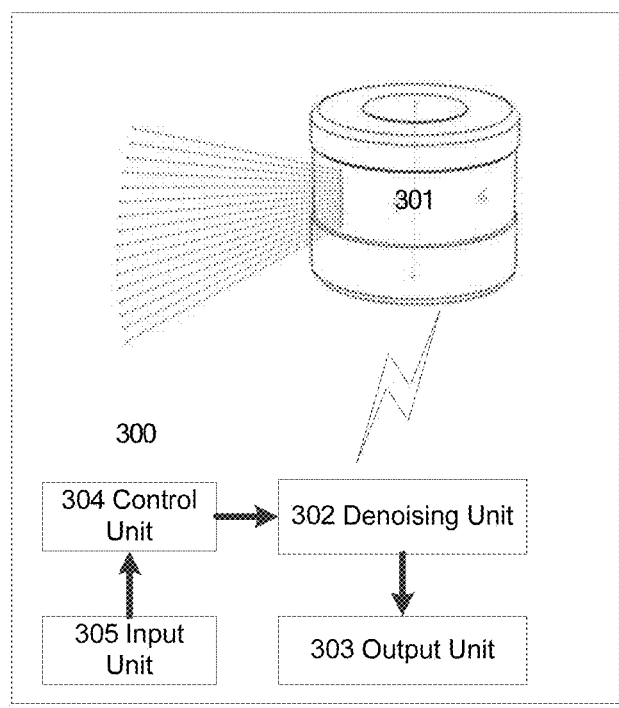
FIG. 7 illustrates a LiDAR system in accordance with one preferable example of the present disclosure.

FIG. 7 illustrates one preferable example described herein. Among others, the LiDAR system 300 further comprises a control unit 304. The control unit 304 is coupled to the denoising unit 302, and may enable or disable the denoising unit 302. In an enabled state, the denoising unit 302 filters out noise points in the point cloud, and the output unit 303 outputs the point cloud with noise points filtered out; and in a disabled mode, the denoising unit 302 is disabled, and the output unit 303 outputs the point cloud without noise points filtered out. Preferably, the control unit 304 is coupled to the LiDAR 301 and the output unit 303.

In accordance with one preferable example described herein, the denoising unit 302 is enabled by default.

In accordance with one preferable example described herein, the denoising unit 302 is disabled by default, and turns enabled under certain circumstances. For example, when crosstalk takes place between adjacent radars, or when rainy, snowy or foggy weather is detected, the control unit 304 enables the denoising unit 302. This is because, in the case of radar crosstalk, or in a rainy, snowy or foggy state of weather, plenty of noise points will be formed in the point cloud.

In accordance with one preferable example described herein, for example, when the number of noise points exceeds a predefined threshold, the denoising unit 302 is enabled. For example, a counter may be provided in the control unit 304 or the denoising unit 302 and count the number of the noise points in a point cloud detected currently; when the count value goes beyond a predefined threshold, it may determine that the current state of weather or work condition causes a great number of noise points, thereby triggering to enable the denoising unit 302.

Preferably, the LiDAR system 300 may further comprise a precipitation sensor, such as an optical sensor or a capacitive sensor. When a state of rainy, snowy or foggy weather is detected, an output signal of the precipitation sensor may be used to trigger to enable the denoising unit 302. An optical sensor, for example, comprises a luminous diode and a transparent window. When no precipitation occurs, almost all light beams emitted by the luminous diode will be reflected onto a photosensitive element. When precipitation occurs, for example, in a state of rainy, snowy or foggy weather, water drops or moisture will appear on the transparent window, part of light beams emitted by the luminous diode will be deflected, and the total amount of light received by the photosensitive element is caused to change, thereby a state of rainy, snowy or foggy weather may be determined and detected, further triggering to enable the denoising unit 302.

In accordance with one preferable example described herein, part of parameters as previously mentioned may be also used to determine rainy, snowy or foggy weather, so as to trigger to enable the denoising unit 302. For example, when the reflectivity of a point in the point cloud is higher than a certain threshold, snowy weather may be determined, thereby triggering and enabling the denoising unit 302 then. Additionally, when the number of echo pulses of a point in the point cloud exceeds a certain threshold, foggy weather may be determined, thereby triggering and enabling the denoising unit 302 then.

As shown in FIG. 7, in accordance with one preferable example described herein, the LiDAR system 300 further comprises an input unit 305 for receiving input from a user. Among others, the control unit 304 may enable or disable the denoising unit 302 according to the input from the user. This has the advantage that the user may decide whether to enable the denoising unit 302 and whether to perform a noise filtering operation.

In accordance with one preferable example described herein, each channel of the LiDAR emits at least dual pulses during one detection, and a time interval between the leading edges of two pulses in the dual pulses is modulated. Thus, the output unit 303 can be configured to check whether any normal points (non-noise points) exist in the current measurement by the channel after noise points or suspected noise points are confirmed. If there are normal points, normal points will be output; otherwise, the noise points or suspected noises point will be output. This solution is beneficial to detection of the edge of an object. FIGS. 5A and 5B show the comparison result, from which it can be seen that the LiDAR system of the present disclosure can be quite effective in filtering out noise points caused by crosstalk between radars, while it generally does not cause loss of points.

Figure 8:
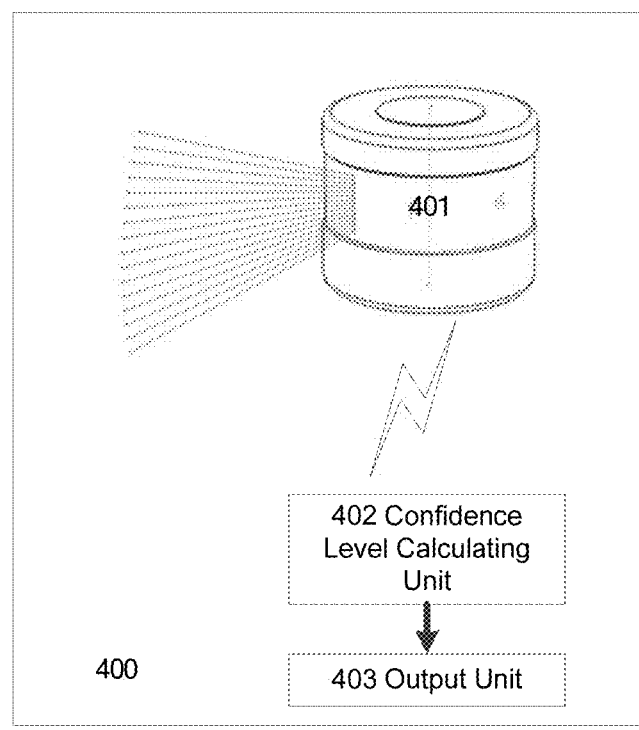
FIG. 8 illustrates a LiDAR system in accordance with another example of the present disclosure.

FIG. 8 illustrates a LiDAR system 400 in accordance with another example described herein. As shown in FIG. 8, the LiDAR system 400 comprises: a LiDAR 401, a confidence level calculating unit 402, and an output unit 403. The LiDAR 401 is configured to scan surroundings to generate point cloud, while its specific structure will not be described in detail here. The confidence level calculating unit 402 is coupled to the LiDAR 401 to receive the point cloud, and is configured to calculate a noise point confidence level of a point of the point cloud at least according to a reflectivity and a continuity parameter of the point. The output unit 403 is coupled to the LiDAR 401 and the confidence level calculating unit 402, and outputs the point cloud and a noise point confidence level of the point in the point cloud.

The calculation method of the noise point confidence level is similar to the description as made in the first aspect of the present disclosure, that is, use of one of the five feature parameters including reflectivity, continuity, distance, noise and the number of echo pulses to perform calculation, or use the combination of more of the five feature parameters to perform calculation. Here, one example will be provided only, and the rest will not go into details. For example, according to reflectivity of a point in the point cloud, and continuity parameter of the point, a noise point confidence level of the point is calculated. The specific calculation comprises, for example, a continuity factor is set to zero when the continuity parameter is beyond a normal range of continuity parameter, otherwise the continuity factor is set as a continuity weight; a reflectivity factor is set to zero when the reflectivity is less than or equal to a predefined threshold for reflectivity, otherwise the reflectivity factor is set as a reflectivity weight; and the noise point confidence level equals to the sum of the continuity factor and the reflectivity factor; wherein the output unit is configured to output points having a noise point confidence level within a normal range of confidence level in the point cloud.

Alternatively, the confidence level calculating unit is configured to obtain reflectivity of an adjacent point in the point cloud as measured immediately previously or subsequently by a channel corresponding to the point. Calculating the noise point confidence level of the point comprises: a continuity factor is set to zero when the continuity parameter is beyond a normal range of continuity parameter, otherwise the continuity factor is set as a continuity weight; a reflectivity factor is set to zero when the difference between the reflectivity of the point and that of the adjacent point is greater than a threshold for reflectivity difference, otherwise the reflectivity factor is set as a reflectivity weight; and the noise point confidence level equals to the sum of the continuity factor and the reflectivity factor; wherein the output unit is configured to output points having a noise point confidence level within a normal range of confidence level in the point cloud.

Similar to the LiDAR system 300 as shown in FIGS. 6 and 7, in the LiDAR system 400 in FIG. 8, the confidence level calculating unit 402 and the output unit 403 may be integrated into the LiDAR 401, or the three may be implemented as separate units. These should both fall within the protection scope hereof.

By the technical solution of the present example, while the point cloud is output, the noise point confidence level of a point in the point cloud may be also provided to a user. In a specific embodiment, one or more bits may be added to the point cloud data of the LiDAR, wherein the confidence level information is written into those bits; the confidence level information is provided to a user for reference; and the user may decide whether to optimize radar point cloud graph or filter out noise points according to the confidence level information.

Figure 9:
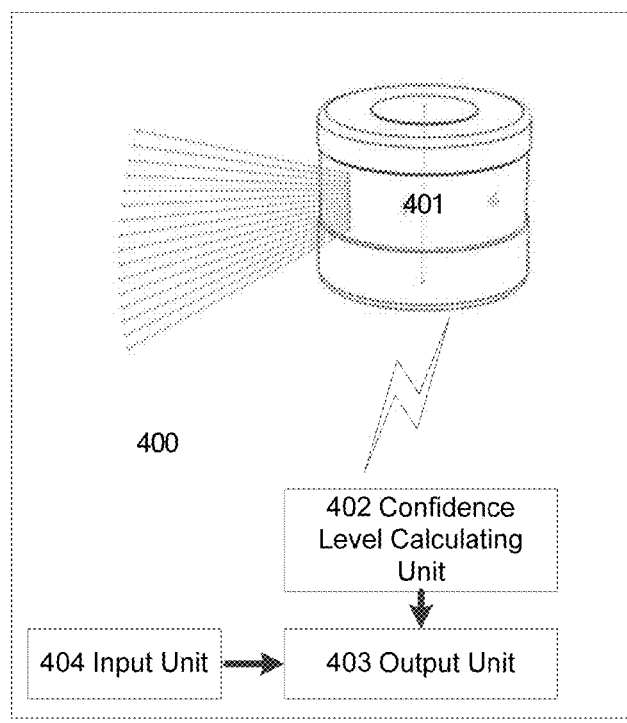
FIG. 9 illustrates a LiDAR system in accordance with another example of the present disclosure.

As shown in FIG. 9, in accordance with one preferable example described herein, the LiDAR system 400 further comprises an input unit 404 for receiving input from a user, wherein the input unit 404 may instruct, according to the input of the user, the output unit 403 about whether to filter out noise points in the point cloud. For example, when a user thinks there are so many noise points in the output point cloud (for example, in the case that another radar is close to the current one) that it is necessary to filter noise points out, the user may use the input unit 404 to instruct the output unit 403 to filter out noise points, and then output the point cloud.

In accordance with one preferable example described herein, wherein each channel of the LiDAR emits at least dual pulses during one detection, and a time interval between the leading edges of two pulses in the dual pulses is modulated. Thus, the output device is further configured such that: if only one point exists in the point cloud in response to one detection by one of the channels, then the point will be output regardless of whether the noise point confidence level of the point is within the normal range of confidence level; and if a plurality of points including noise points and normal points exist in the point cloud in response to one detection by one of the channels, then the noise points will be filtered out while the normal points will be output.

Figure 10:
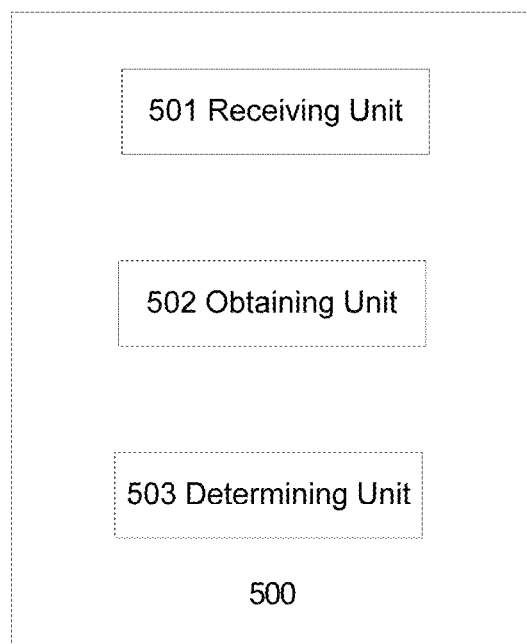
FIG. 10 illustrates a device for identification of noise point used for a LiDAR in accordance with the third aspect of the present disclosure.

In accordance with one preferable example described herein, wherein the continuity parameter is an absolute value of the difference between a distance from the point to the LiDAR and a distance from a point in the point cloud as measured immediately previously or subsequently by a channel corresponding to the point to the LiDAR, or a parameter characterizing the discreteness of the point as calculated out based on the point and a plurality of its surrounding points the point cloud. Here will not go into details Third Aspect Further, the third aspect of the present disclosure involves a noise point identification device 500 for use in a LiDAR. As shown in FIG. 10, the device 500 comprises: a receiving unit 501 configured to receive a point cloud generated by the LiDAR; an obtaining unit 502 configured to obtain a reflectivity and a continuity parameter of a point in the point cloud; and a determining unit 503 configured to determine whether the point is a noise point according to the reflectivity and the continuity parameter.

Figure 11:
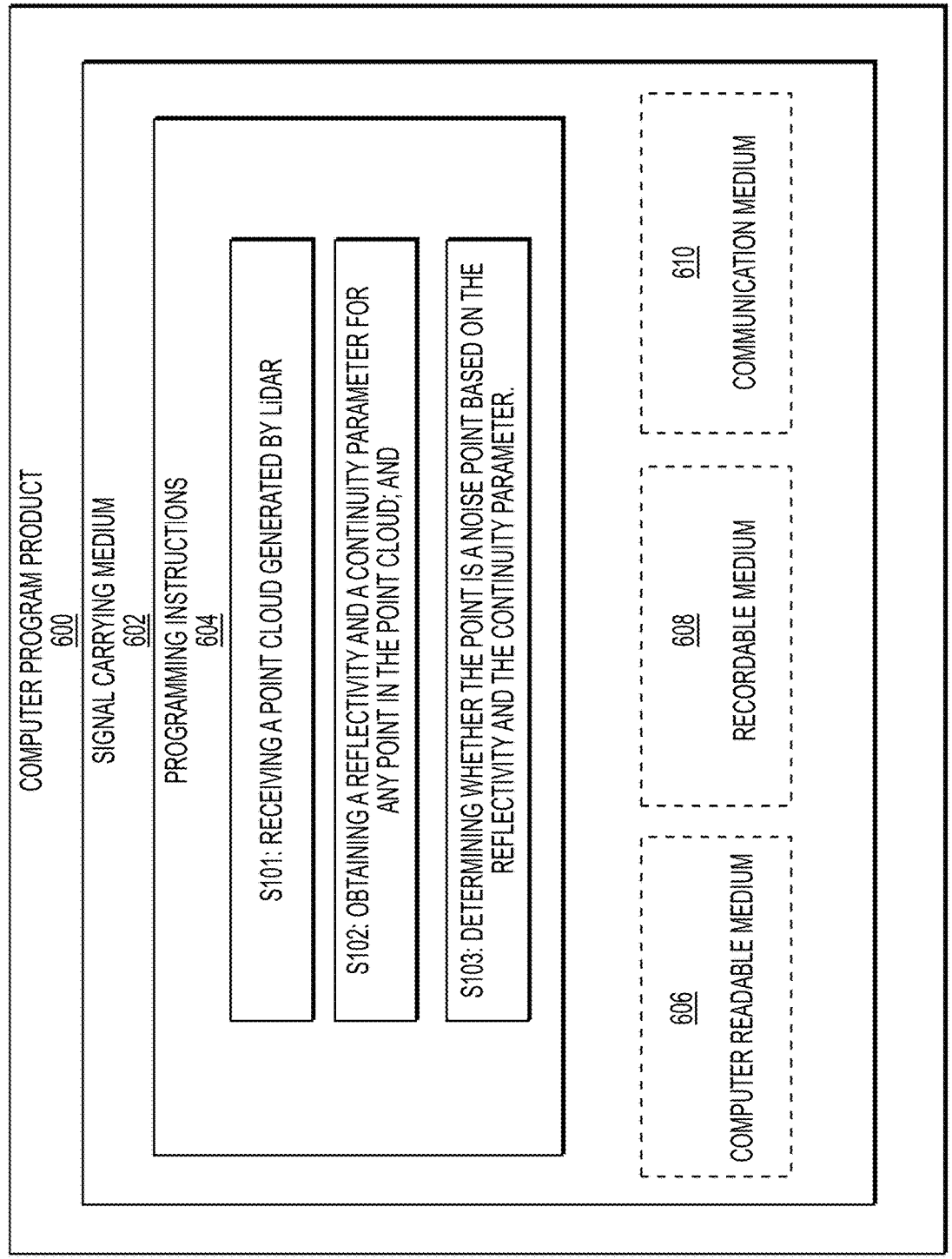
FIG. 11 illustrates a computer program product in accordance with the third aspect of the present disclosure.

The third aspect of the present disclosure also involves a block diagram of a computer program product 600, as shown in FIG. 11. A signal carrying medium 602 may be implemented as, or encompass, a computer readable medium 606, a computer recordable medium 608, a computer communication medium 610, or a combination thereof, which stores programming instructions 604 that may configure a processing unit to execute all or some of the processes described previously. These instructions may include, for example, one or more executable instructions for allowing one or more processors to execute the following processing: Step S201, receiving a point cloud generated by the LiDAR; Step S202, obtaining a reflectivity and a continuity parameter of any point in the point cloud; and Step S203, determining whether the point is a noise point according to the reflectivity and the continuity parameter.

The description of any process or method in a flow chart or otherwise set out herein may be understood to represent one or more modules, segments or portions of codes of executable instructions for steps of achieving a specific logical function or process, and the range of the preferable embodiments hereof covers other implementations, which may be achieved not following the orders shown or discussed herein, including executing a function in view of the function involved by basically simultaneous means or in reverse order. This should be understood by the skilled persons in the technical field of the examples of the present disclosure.

The logics and/or steps shown in a flow chart or otherwise described herein, for example, the one that may be regarded as a sequencing list of executable instructions for achieving a logical function, may be particularly achieved in any computer readable medium for use by instruction execution systems, apparatuses or devices (such as a computer-based system, a system comprising processors or other systems that may read and execute instructions from an instruction execution system, apparatus or device), or combined use with these instruction execution systems, apparatuses or devices. In this description, "computer readable medium" may be any apparatus that may comprise, store, communicate, propagate or transmit programs for use by instruction execution systems, apparatuses or devices, or combined use with these instruction execution systems, apparatuses or devices. A more particular example, instead of an exhausted list, of the computer readable medium includes the following: an electric connection having one or more wiring (electronic device), a portable computer enclosure (magnetic device), a random access memory (RAM), a read only memory (ROM), an electrically programmable read-only-memory (EPROM or flash memory), an optical fiber device, and a CD read-only-memory (CDROM).

Moreover, the computer readable medium even may be paper or other suitable mediums, on which the programs may be printed. This is because the programs may be electronically acquired through, for example, optical scanning for paper or other mediums, and next through editing, decoding, or processing in other suitable ways if necessary, and then will be stored in a computer storage. It should be understood that every part of the present disclosure may be achieved by means of hardware, software, firmware or combination thereof.

In the embodiments described above, multiple steps or methods may be achieved using software or firmware stored in a storage and executed by suitable instruction execution systems. For example, if achieved with hardware, any of the following technologies commonly known in the art, or combination thereof, may be used to do so, just as same as done in another embodiment: a discrete logical circuit of logical gate for achieving logical functions for data signals, an application-specific integrated circuit with suitable combined logical gates, a programmable gate array (PGA), a field programmable gate array (FPGA), etc.

Last but not least, the contents described above are just preferable examples of the present disclosure, and are not used to limit the present disclosure. Although the detailed description of the present disclosure has been provided with reference to the foregoing examples, those skilled in the art still may make modifications to the technical solutions recorded in various examples described above, or conduct equivalent replacement of part of technical features therein. Any modification, equivalent replacement, improvement, if only within the spirit and principles set out herein, should be covered by the protection scope of the present disclosure.

We claim:

1. A method for processing a point cloud generated by a light detection and ranging system, comprising:
   receiving a first measurement generated by the light detection and ranging system;
   retrieving a plurality of second measurements that are adjacent to the first measurement;
   calculating a first parameter by using a distance of the first measurement and distances of the plurality of the second measurements, the first parameter indicating a degree of continuum of the first measurement relative to the plurality of the second measurements; and
   determining whether the first measurement represents a measurement of noises by using the first parameter.

2. The method according to claim 1, wherein the determining comprises comparing the first parameter with an adjustable threshold having a threshold value that is adjusted in accordance with the distance of the first measurement.

3. The method according to claim 2, wherein the threshold value increases with the distance of the first measurement.

4. The method according to claim 1, wherein the calculating further comprises calculating a second parameter by using reflectivity of the first measurement and the plurality of the second measurements, and the determining comprises determining whether the first measurement represents the measurement of noises by using both the first parameter and the second parameter.

5. The method according to claim 1, wherein the determining further comprises determining whether the first measurement represents a measurement of a snowflake or a raindrop.

6. The method according to claim 5, wherein the calculating further comprises calculating a third parameter indicating a noise level of the first measurement, and the determining comprises determining whether the first measurement represents the snowflake or the raindrop by using both the first parameter and the third parameter.

7. The method according to claim 5, wherein the calculating further comprises calculating a fourth parameter indicating a number of echoes detected during generation of the first measurement, and the determining comprises determining whether the first measurement represents the snowflake or the raindrop by using both the first parameter and the fourth parameter.

8. The method according to claim 5, wherein the determining comprises determining whether the first measurement represents the snowflake or the raindrop by using the distance of the first measurement, reflectivity of the first measurement, and a noise level of the first measurement.

9. The method according to claim 1, wherein the calculating further comprises calculating a plurality of parameters indicating reflectivity, a distance, a noise level, or a number of echoes of the first measurement and calculating a confidence level by using the plurality of the parameters, the confidence level indicating whether the first measurement represents the measurement of noises.

10. The method according to claim 9, wherein each one of the plurality of the parameters and the first parameter is assigned a weight, and the confidence level represents an aggregated value of weights assigned to the plurality of the parameters and the first parameter.

11. The method according to claim 10, further comprising:
   adjusting the weight assigned to each of the plurality of the parameters and the first parameter according to a weather condition of the first measurement.

12. The method according to claim 1, further comprising:
   filtering out, in real-time, the first measurement from an output of the light detection and ranging system when the first measurement is determined to represent the measurement of noises.

13. A light detection and ranging system for generating a point cloud, comprising:
   a plurality of laser emitters for emitting laser beams;
   a plurality of laser detectors for detecting backscattered laser beams emitted by the plurality of the laser emitters; and
   one or more processors for generating a measurement of distance based on signals output by the plurality of the laser detectors; and for identifying measurements of noises, wherein the one or more processors are configured to:
      receive a first measurement generated by the light detection and ranging system;
      retrieve a plurality of second measurements that are adjacent to the first measurement;
      calculate a first parameter by using a distance of the first measurement and distances of the plurality of the second measurements, the first parameter indicating a degree of continuum of the first measurement relative to the plurality of the second measurements; and
      determine whether the first measurement represents a measurement of noises by using the first parameter.

14. The light detection and ranging system according to claim 13, wherein the one or more processors are further configured to compare the first parameter with an adjustable threshold having a threshold value that is adjusted in accordance with the distance of the first measurement.

15. The light detection and ranging system according to claim 14, wherein the threshold value increases with the distance of the first measurement.

16. The light detection and ranging system according to claim 13, wherein the one or more processors are further configured to calculate a second parameter by using reflectivity of the first measurement and the plurality of the second measurements, and determine whether the first measurement represents the measurement of noises by using both the first parameter and the second parameter.

17. The light detection and ranging system according to claim 13, wherein the one or more processors are further configured to determine whether the first measurement represents a measurement of a snowflake or a raindrop.

18. The light detection and ranging system according to claim 17, wherein the one or more processors are further configured to calculate a third parameter indicating a noise level of the first measurement, and determine whether the first measurement represents the snowflake or the raindrop by using both the first parameter and the third parameter.

19. The light detection and ranging system according to claim 17, wherein the one or more processors are further configured to calculate a fourth parameter indicating a number of echoes detected during generation of the first measurement, and determine whether the first measurement represents the snowflake or the raindrop by using both the first parameter and the fourth parameter.

20. The light detection and ranging system according to claim 17, wherein the one or more processors are further configured to determine whether the first measurement represents the snowflake or the rain drop by using the distance of the first measurement, reflectivity of the first measurement, and a noise level of the first measurement.

21. The light detection and ranging system according to claim 13, wherein the one or more processors are further configured to calculate a plurality of parameters indicating reflectivity, a distance, a noise level, or a number of echoes of the first measurement and calculate a confidence level by using the plurality of parameters, the confidence level indicating whether the first measurement represents the measurement of noises.

22. The light detection and ranging system according to claim 21, wherein each one of the plurality of the parameters and the first parameter is assigned a weight, and the confidence level represents an aggregated value of weights assigned to the plurality of the parameters and the first parameter.

23. The light detection and ranging system according to claim 22, further comprising:
a weather sensor configured to detect a weather condition of the first measurement,
wherein the one or more processors are further configured to adjust the weight assigned to each of the plurality of the parameters and the first parameter according to a weather condition of the first measurement.

24. The light detection and ranging system according to claim 13, further comprising:
a filtering circuit configured to filter out, in real-time, the first measurement from an output of the light detection and ranging system when the first measure is determined to represent the measurement of noises.

25. The light detection and ranging system according to claim 24, further comprising:
a weather sensor configured to detect a weather condition of the first measurement; and
the one or more processors are further configured to control an activation of the filtering circuit depending on the weather condition.

* * * * *